US008620068B2

(12) United States Patent
Ito et al.

(10) Patent No.: US 8,620,068 B2
(45) Date of Patent: Dec. 31, 2013

(54) IMAGE PROCESSING APPARATUS, IMAGE PROCESSING METHOD, AND MEDIUM STORING PROGRAM THEREOF

(75) Inventors: Naoki Ito, Tokyo (JP); Hiroshi Kaburagi, Yokohama (JP); Tsutomu Sakaue, Yokohama (JP); Takeshi Namikata, Yokohama (JP); Manabu Takebayashi, Isehara (JP); Reiji Misawa, Tokyo (JP); Osamu Iinuma, Machida (JP); Yoichi Kashibuchi, Tokyo (JP); Junya Arakawa, Kawasaki (JP); Shinji Sano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1276 days.

(21) Appl. No.: 12/423,341

(22) Filed: Apr. 14, 2009
(Under 37 CFR 1.47)

(65) Prior Publication Data
US 2009/0297033 A1    Dec. 3, 2009

(30) Foreign Application Priority Data

May 2, 2008   (JP) ................................. 2008-120764

(51) Int. Cl.
*G06K 9/00*   (2006.01)
*G06K 9/34*   (2006.01)

(52) U.S. Cl.
USPC ............ 382/164; 382/165; 382/195; 382/199

(58) Field of Classification Search
USPC .......... 392/164, 165, 173, 180, 195, 197, 199
See application file for complete search history.

(56) References Cited

U.S. PATENT DOCUMENTS

| 6,516,091 | B1 | * | 2/2003 | Nagarajan et al. | ............ | 382/173 |
| 6,718,063 | B1 | * | 4/2004 | Lennon et al. | ................ | 382/224 |
| 7,054,033 | B2 | | 5/2006 | Namikata | | |
| 7,057,764 | B1 | | 6/2006 | Sakaue | | |
| 7,206,100 | B2 | | 4/2007 | Namikata | | |
| 7,239,425 | B2 | | 7/2007 | Namikata | | |
| 7,262,870 | B1 | | 8/2007 | Namikata | | |
| 7,298,513 | B2 | | 11/2007 | Namikata | | |
| 7,379,209 | B1 | | 5/2008 | Dalton | | |
| 7,518,751 | B2 | | 4/2009 | Namikata | | |
| 7,583,420 | B2 | | 9/2009 | Namikata | | |

(Continued)

FOREIGN PATENT DOCUMENTS

| JP | 07-334648 A | 12/1995 |
| JP | 2003-085556 A | 3/2003 |

(Continued)

OTHER PUBLICATIONS

Japanese Office Action dated Mar. 9, 2012, issued by the Japanese Patent Office, in counterpart Japanese Patent Application No. 2008-120764.

*Primary Examiner* — Phuoc Tran
(74) *Attorney, Agent, or Firm* — Fitzpatrick, Cella, Harper & Scinto

(57) ABSTRACT

An image processing apparatus extracts an area for each color from an illustration area, specifies an area that is in contact with the boundary of the illustration area, extracts a color around the illustration area, determines whether or not the extracted color around the illustration area is the same as the color of the specified area, and processes vector data that represents an area that has been determined as having the same color.

18 Claims, 15 Drawing Sheets

(56) References Cited

U.S. PATENT DOCUMENTS

| | | |
|---|---|---|
| 7,831,107 B2 | 11/2010 | Dai et al. |
| 2005/0213160 A1 | 9/2005 | Namikata |
| 2006/0007457 A1 | 1/2006 | Namikata |
| 2006/0061840 A1 | 3/2006 | Kashibuchi |
| 2007/0024880 A1 | 2/2007 | Sato et al. |
| 2007/0025617 A1 | 2/2007 | Dai et al. .............. 382/180 |
| 2007/0030500 A1 | 2/2007 | Otake et al. |
| 2007/0046961 A1 | 3/2007 | Kashibuchi et al. |
| 2007/0074109 A1 | 3/2007 | Nagahara et al. |
| 2007/0086667 A1 | 4/2007 | Dai et al. .............. 382/242 |
| 2008/0019590 A1 | 1/2008 | Arakawa |
| 2008/0130963 A1 | 6/2008 | Sakaue |
| 2008/0316510 A1 | 12/2008 | Sakaue |
| 2009/0009782 A1 | 1/2009 | Arakawa |
| 2009/0034007 A1 | 2/2009 | Sano et al. |

FOREIGN PATENT DOCUMENTS

| | | |
|---|---|---|
| JP | 2006-157791 | 6/2006 |
| JP | 2006-323870 A | 11/2006 |
| JP | 2006-344069 | 12/2006 |
| JP | 2007-0074109 A | 3/2007 |
| JP | 2007-109177 | 4/2007 |
| JP | 2007-156841 A | 6/2007 |
| JP | 2007-172573 A | 7/2007 |

* cited by examiner

F I G. 3
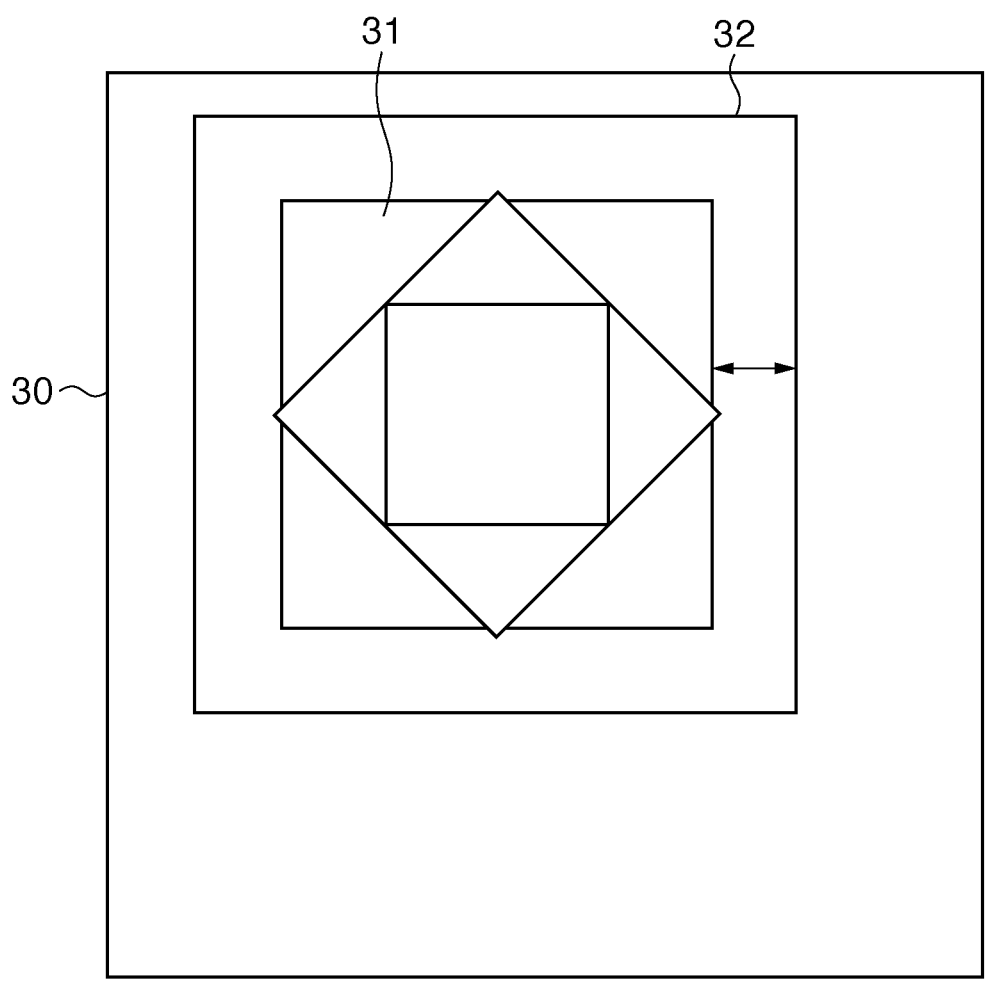

F I G. 6A

```
<?xml version="1.0"?>
<svg:svg xmlns:svg="http://www.w3.org/2000/svg" xmlns:xlink="http://www.w3.org/1999/xlink" xmlns:rcd="http://www.canon.com/ns/rcd" width="606" height="862"
viewBox="0 0 2361 3388">

<svg:image x="0" y="0" width="1240" height="1760" xlink:href="data:image/jpeg;base64,/9j/
2wCEAB8 VFxsXEx8bGRsjIR8kLK0yLioqLl5DRzhNb2J1c21lbGp 7lrGWe4 O nhGpsmtGcp 7a8
xsjGd5TZ6NfA5rHCxr4BlSMjLiguWjjyWr5/bH+++vr6+vr6+vr6+vr6+vr6+vr6+vr6+vr6+
........
FFABRQB//ZAAA=">
</svg : image>

<svg:svg x="188" y="284" width="896" height="148"rcd:gType="stringText">
    <svg:text fill="#020202"font-size="150">
        <svg:tspan y="144" x="0 149 299 449 609 750 ">CANON TARO</svg:tspan>
    </svg:text >
</svg:svg >
```

F I G. 6B

```
<svg:svg x="188" y="284" width="896" height="48" rcdgType="vectorText">
  <svg:g fill="#020202">
    <path d=" M123.3,779h1.2c2.4,0 10.7,3.1 10.7,4v12h1.4q1.4,0 3.8,-1q2.4,-1 8.6,-4h1c3.5,0 8.2 8.8,5
v2q-14,2 -20,2v3q0,3 2,6.6v2.4h2q2,0 6.9,-1.5q5,-1.5 12.1,-4.5h0.5c3,3,0 9.5,3.3 9.5,5
c0,0.8 -23,6.6 -27,6h-1v3q7,2 7,23c0,0.8 -3,2,4 -4,4c-3,1,0 -4.9,-3.4 -6.8-12.3c-1.4,-7 -2,-9.4 -3,-11.7
q-0.2,-0.4 -0.2,-0.7v-2.4h-2q-2,0 -7,5,2,3q-5,5,2,2 -13,5,7c-3,2,0 -9,5,-6,7 -9,5,-10v-2h3
q3,1,2,4 4,1,3,2q0,9,0.8 1,9,0.8c4,0.21,-5.7 21,-7q-2,-5 -2,-9v-1h-3q-3,0 -6,1,1,3q-3,2,1.3 -8.9,3.7
h-0.5c-3,4,0 -9,5,-5.1 -9,5,-8c0,-1 1.3,-3.2,-3q3,3 5.3h4q10,-2 14,-2v-2.5c0,-3.8 -3,8,-10.5 -6,-10.5
h-3v-1.5c0,-0.3 3,-3.5 3,3,-3.5z"/>
    <path d=" M199,781h1c2,4,0 9,6,2,2 9,6,3v15h3,2q3,2,0 11.1,-2q7,8,-2 16.1,-5c2,2,0 8,5,8 8,8v2
h-5q0,0 0c-1,2,7 -23,2,18 -26,18h-1v2,5q5,18,5 5,21v0.5c0,1.2 -2,1.4 -3,4c-4,1,0 -5.2,-1.9 -6.8,-12.8
c-2,1,-14,2 -3,6,-22,2 -5,-26,2q-0.2,-0.4 -0.2,-0.7v-2.4h-1q-1.5q-1.5,0 -7,6,2,3q-6,2,2,3 -10,9,4.7c-2,9,0 -8,-6,1 -8,-9,5
v-2,5h2q3,1,2 4 4,1,3,2q0,9,0.8 1,9,0.8q12,-3 18,-3v-3c0,-6.7 -3,4,-13 -7,-13h-2v-2
c0,-1 2,7,-3 4,-3m34,19c-4,0 -21,4,9 -21,6q2,6 2,11h1,5c1,9,0 17,5,-14,2 17,5,-16v-12"/>
  ...
  </svg:g>
</svg:svg>

<svg:svg x="193" y="631" width="311" height="205" rcdgType="vectorLineArt">
  <svg:path fill="none" stroke="#000000" stroke-width="1.0" stroke-linecap="square"
    d=" M1724,2367c-5,5,0 -15,2,12,3 -27,34c-8,2,15 -15,17,2 -79,1,24.5c-37,4,4,3 -63,9,10.1 -63,9,14q0,0.3 0,2,0.4c2,2,1.6 2,5,2,1 3,6,4,5
c1,3,3,1,9,3,6 6,2,3,6h2q2,0 3,5,2c0,3,0 1.5,-1.2 1.5,-1.5c0,-0.3 3,1,-1.5 4,-1.5q2,0 2,5,0.5q0.5,0.5 7,5,5,5
h12c5,7,0 13,6,7 13,12c0,10.5 -16,3,23 -30,23q-4,0 -6,6,-1.5q-2,-7,-1.5 -12,4,-10.5q-7,4 -9,5,4c-4,2,0 -12,3,-6,6 -12,3,-10
v-11h-3,2c-5,4,0 -20,27,7 -20,38c0,2,8 3,6,5 8,5h14c0,4,9 0,12,-4,2 12,-7q0,-1 -3,-6
v-3,5c0,-22,1 30,5,-49,5 55,-49,5q2,3,0 41,1,6q5,0.2 13,5,2.4q3,5,0 8,5,-2c23,2,0 54,27,9 54,49q0,4 -0.5,4,4
q-0.5,0.3 -3,5,5,1c0,1,6 6,4,4,5 10,4,5h3,5c36,0 68,5,-5,7 68,5,-12c0,-31.1 -17,8,-49.1 -64,-64,-64,5q-25,1,-8,4 -30,4,-12,5
q-6,1,-4.8 -16.1,-24c-6,5,-12,5 -15,6,-21 -22,5,-21h-66v0z"/>
  ...
</svg:svg>
```

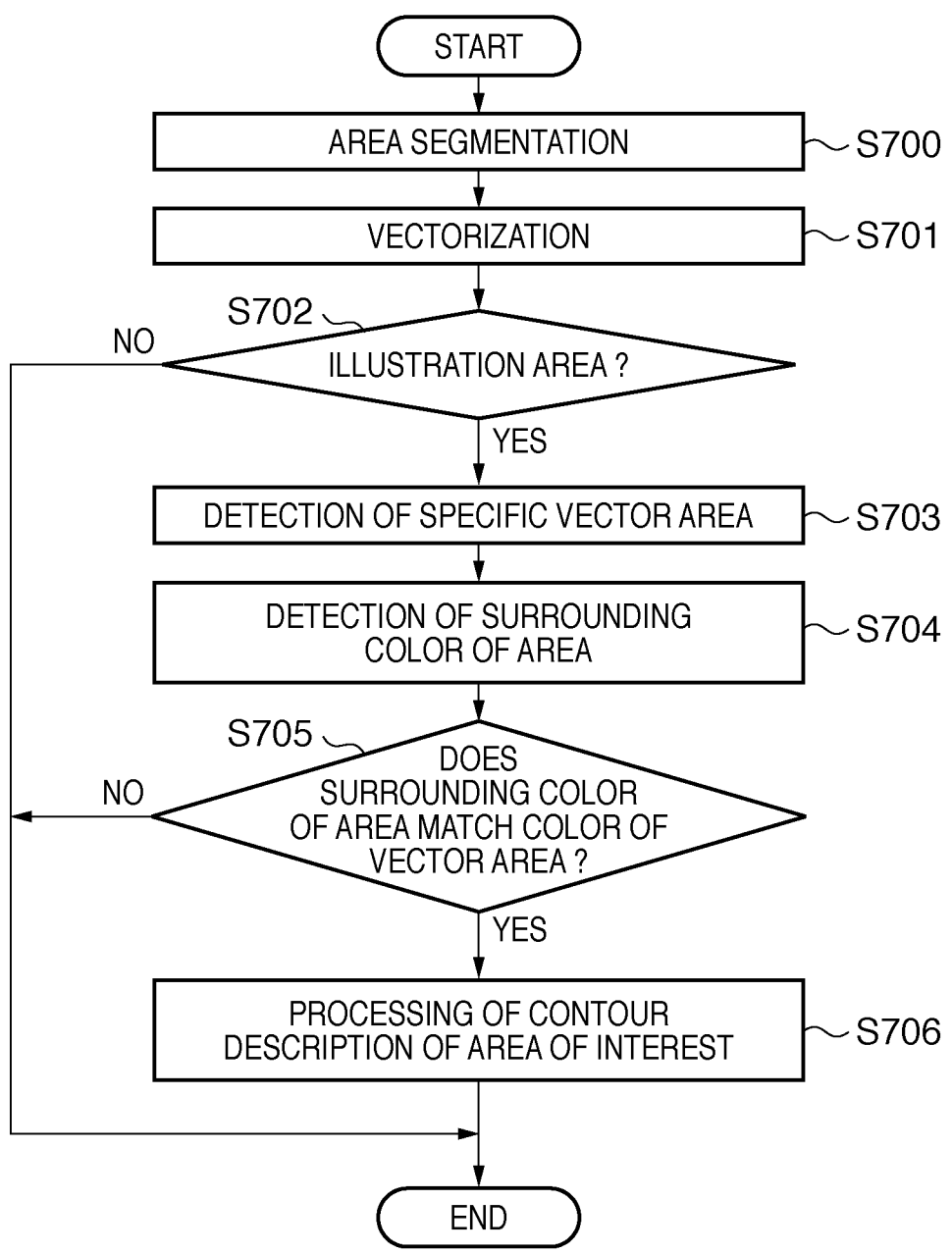

FIG. 8
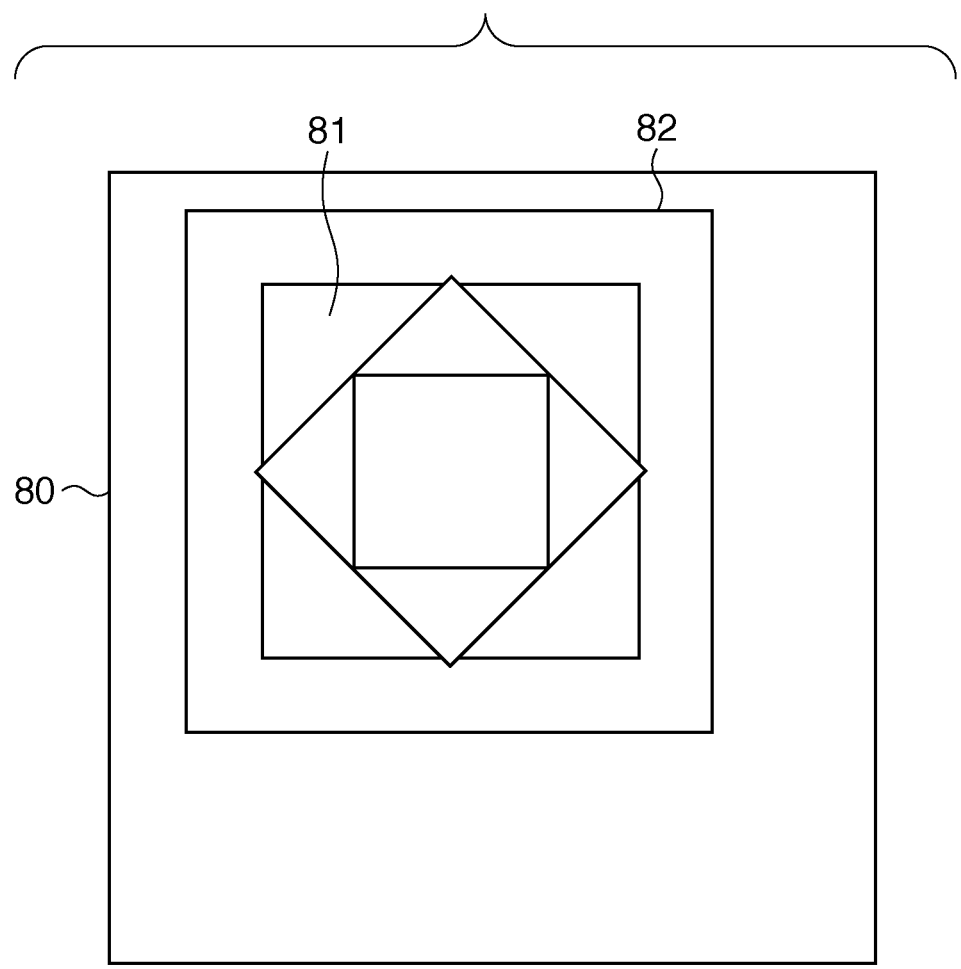
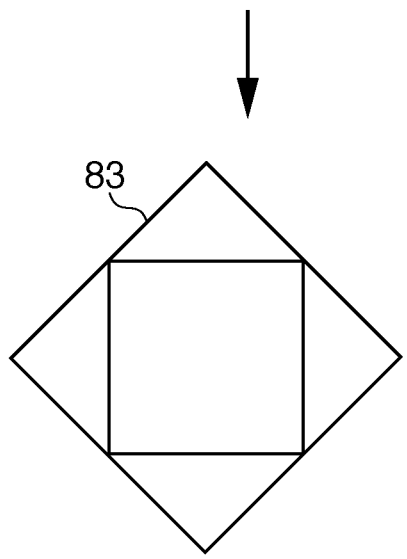

IMAGE PROCESSING APPARATUS, IMAGE PROCESSING METHOD, AND MEDIUM STORING PROGRAM THEREOF

BACKGROUND OF THE INVENTION

1. Field of the Invention

The present invention relates to an image processing apparatus for performing vectorization processing, a method thereof, and a medium storing a program thereof.

2. Description of the Related Art

There is a technique for generating vector data by scanning an original document and vectorizing characters and line drawings in the scanned image. Japanese Patent Laid-Open No. 2006-344069 discloses a technique for generating vector data from an image created using illustration/graphics software, or the like. In the specification of the present invention, those images called illustrations (or clip-art) shall have the features of clearer contours for physical objects than natural images such as photographs, or the like and a limited number of appearance colors. In other words, the term "illustrations (clip-art)" as used herein refers to simple images rather than complicated images such as photographs, or the like. Such illustrations vectorized from scanned images are often reused in such a way as to be pasted into other pages or images, or the like.

According to Japanese Patent Laid-Open No. 2006-344069, at the time of the vectorization of a rectangular area including an illustration, clustering is performed based on color, so that even a portion considered as being the background is vectorized as a single color. As a result, when such a vectorized illustration is reused for output, even a portion considered as being the background will be converted into vector data and colored. Thus, the resultant vector data on such an illustration includes even vector data on the background portion; therefore, when such vector data on an illustration is reused in such a way as to be pasted into other pages and the like, not only the main data on the illustration but also data on the background portion will be pasted together. In such pasting, if the background color within a rectangular area of an illustration is different from the base color of an area into which the illustration is pasted, the appearance of the resultant image is degraded.

SUMMARY OF THE INVENTION

The present invention provides an image processing apparatus that simplifies the processing of an input image, thereby improving the convenience of reusing such an image.

The present invention in its first aspect provides an image processing apparatus for extracting an illustration area from an input original image to generate vector data on the illustration area, comprising: an area extraction unit configured to extract an area for each color from the illustration area; a vector-data generation unit configured to generate vector data that represents each of the areas extracted by the area extraction unit; an area specification unit configured to specify an area that is in contact with a boundary of the illustration area from among the areas extracted by the area extraction unit; a color extraction unit configured to extract a surrounding color around the illustration area; a determination unit configured to determine whether or not the surrounding color around the illustration area that has been extracted by the color extraction unit is the same as a color of the area specified by the area specification unit; and a processing unit configured to process vector data that represents an area that has been determined as having the same color by the determination unit.

The present invention in its second aspect provides an image processing method for extracting an illustration area from an input original image to generate vector data on the illustration area, the method comprising the steps of: extracting an area for each color from the illustration area; generating vector data that represents each of the areas extracted in the area extraction step; specifying an area that is in contact with a boundary of the illustration area from among the areas extracted in the area extraction step; extracting a surrounding color around the illustration area; determining whether or not the surrounding color around the illustration area that has been extracted in the color extraction step is the same as the color of the area specified in the area specification step; and processing vector data that represents an area that has been determined as having the same color in the determination step.

The present invention in its third aspect provides a computer-readable medium storing an image processing program causing a computer to execute a process for extracting an illustration area from an input original image to generate vector data on the illustration area, the program causing the computer to function so as to: extract an area for each color from the illustration area; generate vector data that represents each of the extracted areas; specify an area that is in contact with a boundary of the illustration area from among the extracted areas; extract a surrounding color around the illustration area; determine whether or not the extracted surrounding color around the illustration area is the same as the color of the specified area; and process vector data that represents an area that has been determined as having the same color.

According to the present invention, such simplified processing of an input image can improve the convenience of reusing such an image.

Further features of the present invention will become apparent from the following description of exemplary embodiments with reference to the attached drawings.

BRIEF DESCRIPTION OF THE DRAWINGS

FIG. 3 is an illustration of a method of extracting a color outside an illustration area.

FIGS. 6A, 6B and 6C show an example of a format of vectorized data.

FIG. 7 is a flow chart illustrating the procedure of image processing according to the first exemplary embodiment.

FIG. 8 shows an example of an illustration area processed by a vector-information processing unit.

DESCRIPTION OF THE EMBODIMENTS

Figure 1:
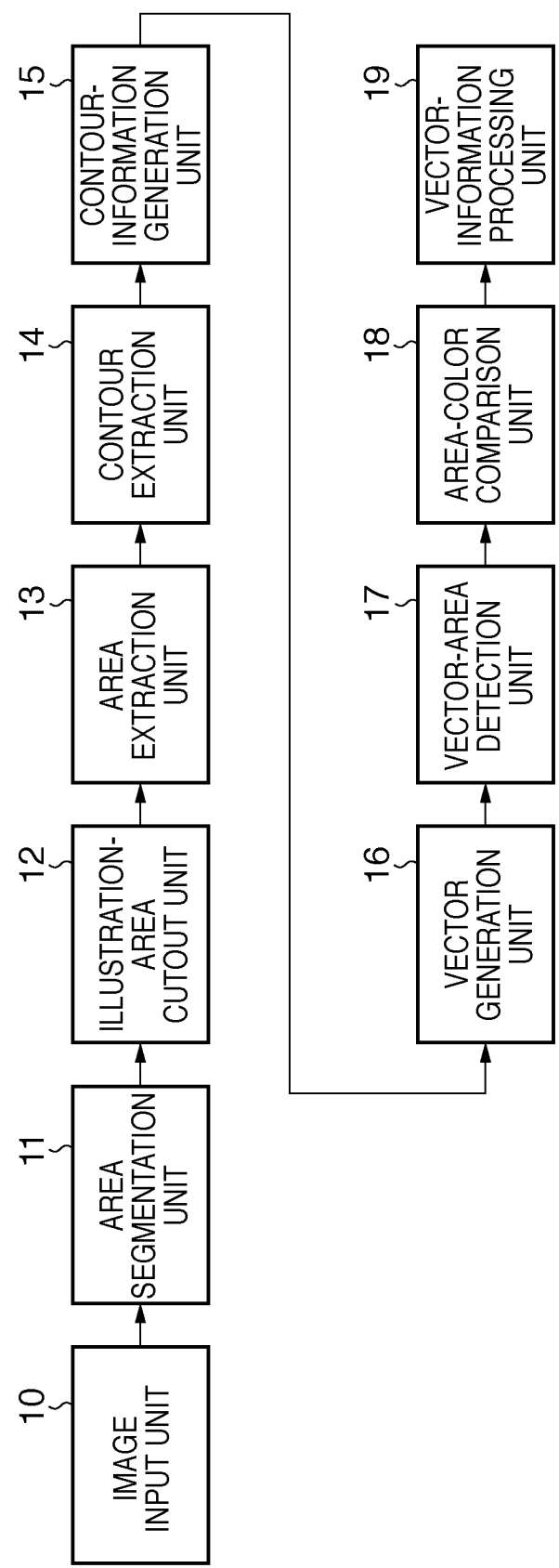
FIG. 1 is a block diagram of a configuration of an image processing apparatus according to a first exemplary embodiment.

Hereinafter, preferred embodiments of the present invention will be described in detail with reference to the drawings. The same or similar components are designated by the same reference numerals and their description will be omitted.

First Exemplary Embodiment

FIG. 1 is a block diagram of a configuration of an image processing apparatus according to a first exemplary embodiment. An image input unit 10 is an image reader such as a scanner, or the like. The image input unit 10 inputs an original image to be processed. An area segmentation unit 11 segments an input original image into areas (e.g., circumscribed rectangular areas), such as a character areas a line-drawing areas a chart areas a photographic area, etc., according to attribute. In that case, the remaining part of the image other than those divided areas is regarded as the background area. In area segmentation processing according to the present exemplary embodiment, a multi-valued color image, which is input with a scanner, is converted into a binary image; clusters of coupled black pixels (black-pixel clusters) on the binary image are detected; and black-pixel clusters are coupled to create an area. Then, based on the size, aspect ratio, black-pixel density and the like of the created area, the attributes of each area are distinguished. In this case, since the photographic area is large in size and high in pixel density, an illustration area is also classified as a photographic area at the time of area segmentation according to attribute, performed by the area segmentation unit 11.

An illustration-area cutout unit 12 cuts out (extracts) an illustration area (or illustration image) from the obtained photographic area. The term "cut out" as used herein shall refer to both the case of cutting any arbitrary area out of the photographic area and the case of cutting out the entire photographic area. The term "illustration area" as used in the present exemplary embodiment refers to an image area that is part of a photographic area and has a given number (e.g., 256 gradations) or less of appearance colors. Examples of such illustration images include user-created computer graphics images (images other than natural images such as photographs) that are artificially created with image processing software. In other words, illustration images correspond to those images in which, unlike in natural images, image-forming pixels of the same color are relatively not so dispersed.

Although in the present exemplary embodiments the area segmentation unit 11 is configured to discriminate an illustration area after having discriminated a photographic area, the present invention is not limited thereto. For instance, the area segmentation unit 11 may employ such an area segmentation technique that allows direct discrimination of an illustration area.

An area extraction unit 13 extracts a color area (or color image) for each appearance color of the image of an illustration area. That is, for each illustration area, clustering is performed based on color so that an area for each color is extracted.

A contour extraction unit 14 extracts the contour of each extracted color area. A contour-information generation unit 15 generates a rendering command (e.g., an SVG path command) that defines such a contour as contour information. SVG (Scalable Vector Graphics) is a description language (image description language) that is used to represent contours as vector data. A vector generation unit 16 performs approximations of functions to generate vector data on such contours generated by the contour-information generation unit 15 (vector data generation). The "approximations of functions" as used herein may include, for example, approximations of generally-known spline functions or Bezier functions.

Figure 2:
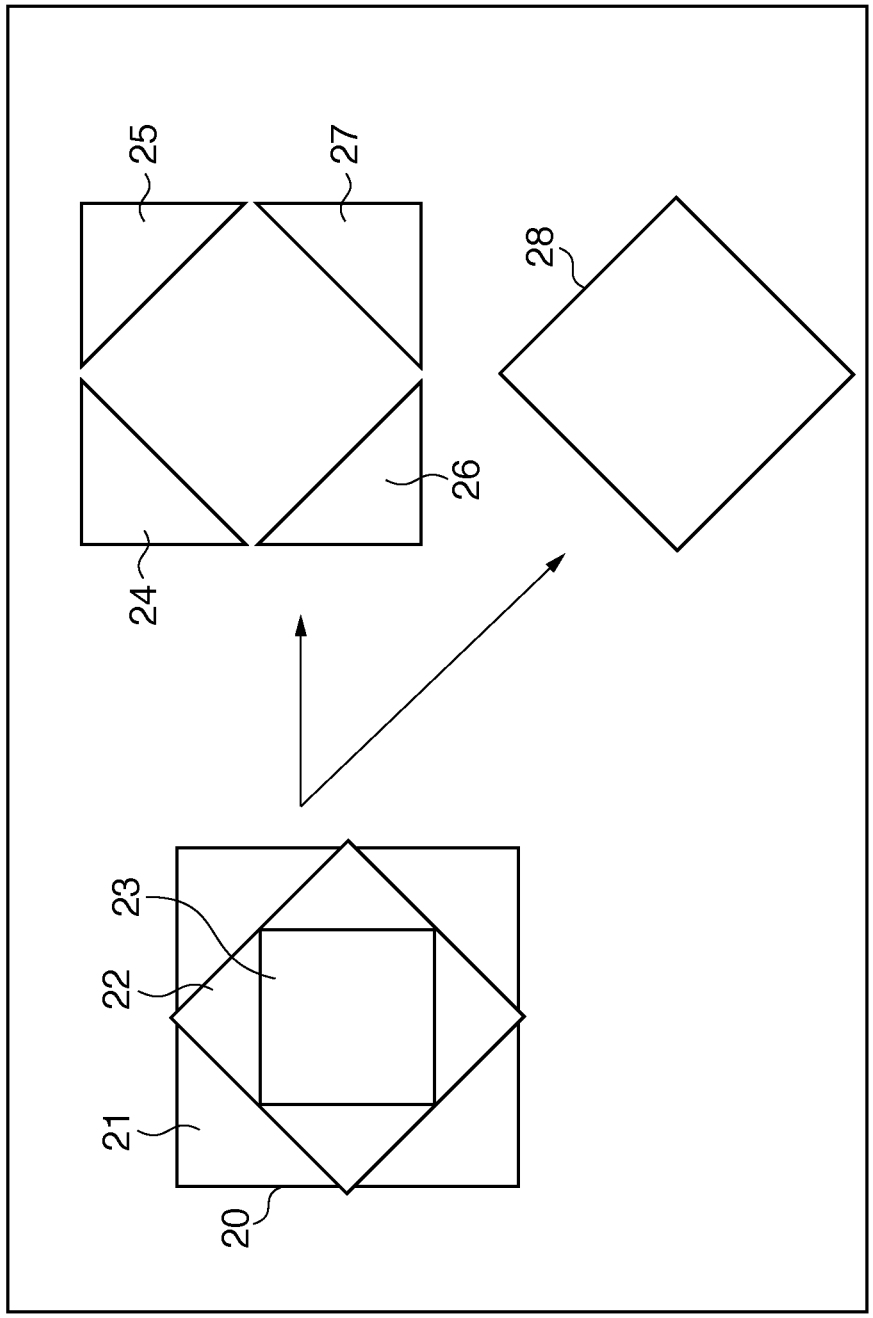
FIG. 2 is an illustration of how to detect a vector area according to an exemplary embodiment of the present invention.

A vector-area detection unit 17 detects a vector area that is in contact with the boundary of an illustration area, which is a rectangular area. Referring now to FIG. 2, how the vector-area detection unit 17 according to the present exemplary embodiment detects a vector area that is in contact with the boundary of an illustration area is described. As illustrated in FIG. 2, clustering is performed for each color area within an illustration area 20 (rectangular area), and the contour of each color area is vectorized. As a result, a vector area 21 of a first color (in FIG. 2, four triangular areas of the same color at the four corners of the illustration area), a vector area 22 of a second color, and a vector area 23 of a third color are output from the vector generation unit 16. At this time, the vector-area detection unit 17 detects a vector area that is in contact with the rectangular boundary of the illustration area 20. That is, a vector area that is in contact with the boundary of the illustration area is specified (area specification).

In the present exemplary embodiment, it is determined whether or not each vector area is located on the coordinates of the rectangular area. Here, the detection of a circumscribing vector area may be made by determining whether or not the anchor point of a vector area is located on the rectangular area. In FIG. 2, vector areas 24, 25, 26, 27, and 28 are determined as those that are in contact with the boundary of the illustration area 20.

Referring back to FIG. 1, an area-color comparison unit 18 makes a comparison between the color of each vector area that is detected as being in contact with the boundary of the illustration area by the vector-area detection unit 17 and the color outside the illustration area. Now, a method of extracting the surrounding color outside the illustration area is described with reference to FIG. 3. An input original image 30 illustrated in FIG. 3 represents the entire image of an input original document. An illustration area 31 is subjected to vector processing. In the present exemplary embodiment, the colors of those points that are two pixels away from the illustration area are extracted (color extraction), and an average value of those colors is obtained and defined as the color outside the illustration area. An area 32 illustrated in FIG. 3 is the area outside the illustration area 31. Alternatively, the colors of those points that are any number of pixels, instead of two pixels, away from the illustration area may be extracted. As a method of extracting the color outside the illustration area, a commonly-used method of extracting the color of an area adjacent to an appropriate area may be used.

Then, the color of a vector area that is in contact with the boundary of the illustration area is compared with the color outside the illustration area. Examples of the comparison method include a method of determining whether or not both colors are completely identical, and a method of obtaining a difference between both colors and then determining whether or not the difference is equal to or greater or smaller than a prescribed numerical value. For example, consider the case where the color of a vector area that is in contact with the boundary of the illustration is represented by R=200, G=150, and B=30. If the color outside the illustration area is represented by R=190, G=140, and B=40, the difference therebetween is 10 for R component, 10 for G component, and 10 for B component. In this case, if the predetermined setting is, for example, such that both colors are determined as being equal when the difference for each color component is 20 or smaller, the color of the vector area that is in contact with the boundary of the illustration and the color outside the illustration area, in the aforementioned example, are determined as being the same.

A vector-information processing unit 19 processes the contour of a vector area that is determined as having the same color as the area outside the illustration area. In the present exemplary embodiment, the contour of such a vector area is deleted from a vector description of the contour; however, the present invention is not limited thereto. For example, the contour of such a vector area may be modified so as to be transparently colored or uncolored. The details of such modification of the vector description by the vector-information processing unit 19 will be described later. In the present exemplary embodiment, the image processing apparatus can be implemented by, for example, an information processor such as a personal computer, or the like. Such an information processor includes standard components (such as a CPU, a RAM, a ROM, a hard disk, external memory, a network interface, a display, a keyboard, a mouse, or the like) that are used to equip a general-purpose computer. The procedures illustrated in the flow charts of FIGS. 5, 7, 10, 11, and 13, which will be described later, are implemented by, for example, a CPU.

Figure 4:
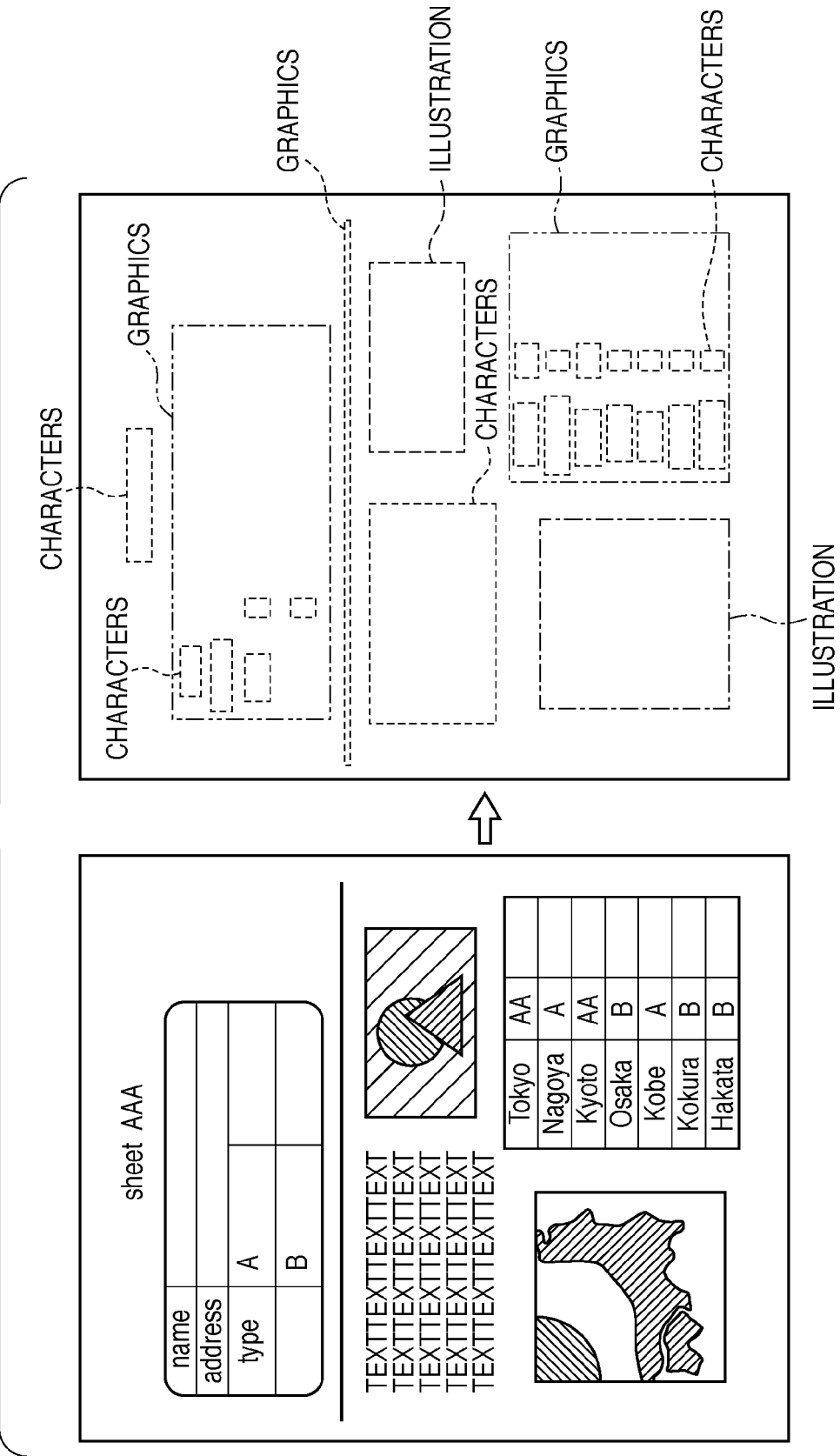
FIG. 4 is an illustration of a sample of an original image that is input from an image input unit.

Referring next to FIG. 4, a sample of an original image that is input from the image input unit 10 is described. FIG. 4 shows an example of an original image. This document image is printed on print medium by an output unit such as a printer, or the like. This document image includes large letters such as a heading, and relatively small letters such as captions. The document image also includes photographic images and clip-art images that are images with a relatively smaller number of appearance colors than the photographic images. Such clip-art images are also called illustrations and have the features of clearer contours for physical objects than natural images such as photographs or the like and a limited number of appearance colors, or the like. Such illustrations are often reused in such a way as to be pasted into other pages or images, or the like. Printed matter with such a document image printed thereon is read by an image reader such as an image scanner, or the like, and the read image is subjected to area segmentation processing, whereby areas such as text areas, graphics areas and the like, as illustrated in FIG. 4, are obtained.

Figure 5:
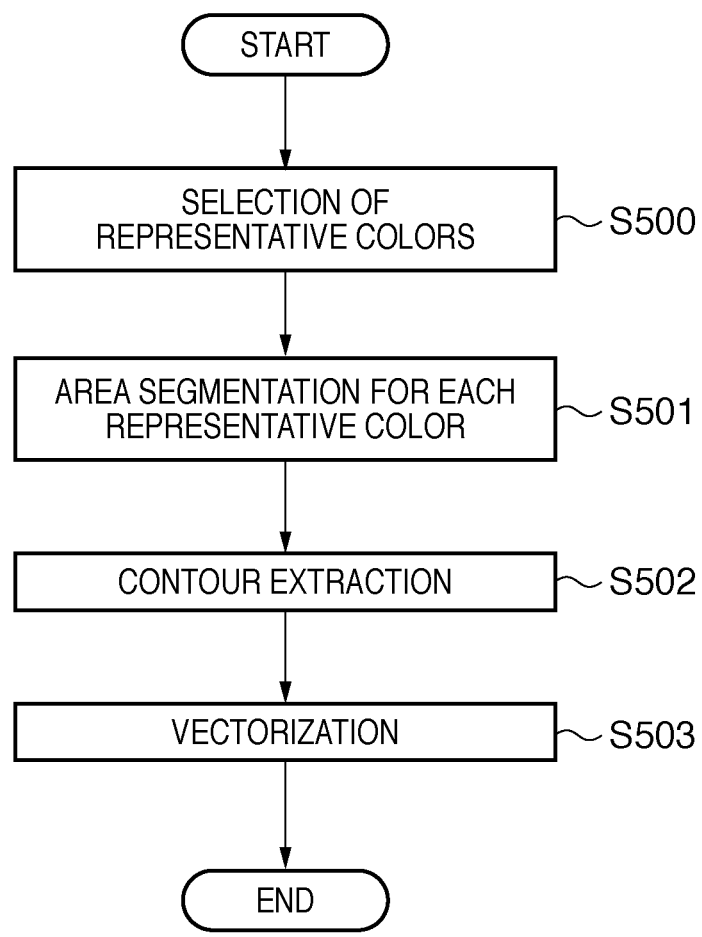
FIG. 5 is a flow chart illustrating the procedure of the vectorization processing of an illustration area according to an exemplary embodiment of the present invention.
Figure 6C:

Next, the process until the illustration area is vectorized is described. FIG. 5 is a flow chart illustrating the procedure that corresponds to the process from the area extraction unit 13 to the vector generation unit 16 in FIG. 1. In step S500, the area extraction unit 13 selects representative colors within an illustration (clip-art) area. Those colors that are closely analogous to each other within the prescribed limits shall be regarded as the same color and merged into a single representative color. In step S501, a color area of each selected representative color (the aforementioned appearance color) is extracted. Then, in step S502, the contour extraction unit 14 extracts the contour of the color area extracted for each color. In step S503, firstly, the contour-information generation unit 15 generates contour information on the contours extracted by the contour extraction unit 14, using the selected representative colors. In the present example, such contour information is generated by using, for example, SVG (Scalable Vector Graphics), specifically, describing the contours using Path commands and describing their inner colors using Fill commands. Secondly, based on the contour information generated by the contour-information generation unit 15, the vector generation unit 16 makes approximations of functions so that the contours have smooth shapes. FIGS. 6A to 6C show an example of such vectorized contour information. Although in the present exemplary embodiment, the description is written in SVG format, it may be given in any other format. The SVG Path instruction (Path command) described in FIGS. 6A to 6C defines a contour. A description enclosed by angle brackets gives a set of commands. The Fill instruction (Fill command) is a description that specifies the inner color of an area enclosed by a contour. The Stroke instruction (Stroke command) is a description that specifies the contour color.

The Stroke-width instruction (Stroke-width command) is a description that specifies the contour width.

The part described as <svg:svg x=" . . . " y=" . . . " is a description that specifies the location (or coordinate values) to render a contour.

The Stroke-linecap instruction (Stroke-linecap command) is a description that specifies the shape of a line end.

The Stroke-linejoin instruction (Stroke-linejoin command) is a description that specifies the shape of a line joint on display.

In the description of FIGS. 6A to 6C, "M" represents relative movement; "h" and "v" represent, respectively, horizontal and vertical movement of relative coordinates; "c" and "q" represent, respectively, tertiary and secondary Bezier curves; and "z" represents the Closing-path instruction (to close a path).

Hereinafter, the processing of vector information according to the present exemplary embodiment is described with reference to FIGS. 6A to 6C. The SVG Path instructions that define contours are replaced by independent Path instructions for each single closed path.

To represent an illustration (clip-art) area within an input image, for example, contour information including compound paths and subpaths is used. The term "subpath" as used herein refers to a single path description that represents a single closed curve (or contour loop), and the term "compound path" as used herein refers to a single path description that represents a plurality of closed curves (or contour loops). In the case of a compound path, an external contour and an internal contour are described by changing the direction of rotation of the contour coordinates, so that the space between those contours can be colored with a specified color. In the processing of vector information, in order to perform "deletion", the description of a target contour loop is deleted. Alternatively, for example, the description of a target contour loop may include a description such as "<path fill="none" . . . >" as illustrated in FIGS. 6A to 6C, which provides the instruction not to color a target contour loop.

In the way described above, the processing of vector information is performed. It is noted herein that if the same or similar effects can be achieved with such instructions as to delete a target contour loop or not to color a target contour loop, any description other than those in SVG may be modified to perform the processing of vector information. Furthermore, instead of the above example, any other processing such as changing the color of a contour loop into a different color, or the like may be performed.

FIG. 7 is a flow chart illustrating the procedure of image processing according to the first exemplary embodiment. First, in step S700, area segmentation processing is performed. Specifically, an input original image is segmented into areas (e.g., rectangular areas), such as a character area, an illustration area, a graphics area, a photographic area, and the like, according to attribute (i.e., an area for each attribute is extracted from an original image.) The remaining part of the image other than those divided areas is regarded as a background area. Then, in step S701, vectorization processing is performed for each divided area. The processing in this step is identical to that described in FIG. 5. Then, in step S702, whether or not each divided area is an illustration area is determined. When the area is determined as not being an illustration area, the process is ended. When the area is determined as being an illustration area, on the other hand, the process goes to step S703. In step S703, specific-vector-area detection processing is performed, which is identical to that described for the vector-area detection unit 17 in FIG. 1. In step S704, the color outside the illustration area is extracted. The processing in step S704 is identical to that described for the vector-area detection unit 17 in FIG. 1. In step S705, a comparison is made between the color outside the illustration area and the color of each vector area that is in contact with the boundary of the illustration area. The processing in step S705 is identical to that described for the area-color comparison unit 18 in FIG. 1. In step S705, when the color outside the illustration area and the color of a circumscribing vector area are determined as being the same, the process goes to step S706; on the other hand, when they are determined as not being the same, the process is ended. In step S706, the description of the contour of the appropriate area (i.e., the vector area determined as having the same color) is processed. The processing in step S706 is identical to that described for the vector-information processing unit 19 in FIG. 1.

FIG. 8 shows an example of such processed vector information obtained from the vector-information processing unit 19. FIG. 8 illustrates an input original image 80, an illustration area 81 (equivalent to the illustration area 20 in FIG. 2) that is divided into areas, and an area 82 outside the illustration area 81. The input original image 80 is subjected to the detection of vector areas that are in contact with the boundary of the illustration area, the comparison of area colors, and the processing of vector information, the resultant of which is an image 83. Specifically, since the vector areas 24 to 27 in FIG. 2 are determined as having the same color as their outside area 82 and are thus deleted, the description part that corresponds to the vector areas 22 and 23 (i.e., the image 83) is left. FIG. 8 shows an example where the description of a target vector area is deleted. Alternatively, the vector information may be processed in other ways such as applying no color or applying a different color, or the like, instead of deleting the description. As described above, in the present exemplary embodiment, vector data on the contours of vector areas that circumscribe the illustration area is processed so that the area outside the illustration area and the vector areas circumscribing the illustration area are contiguous to one another, which contributes to an improvement in the convenience of reusing illustrations.

Second Exemplary Embodiment

Figure 9:
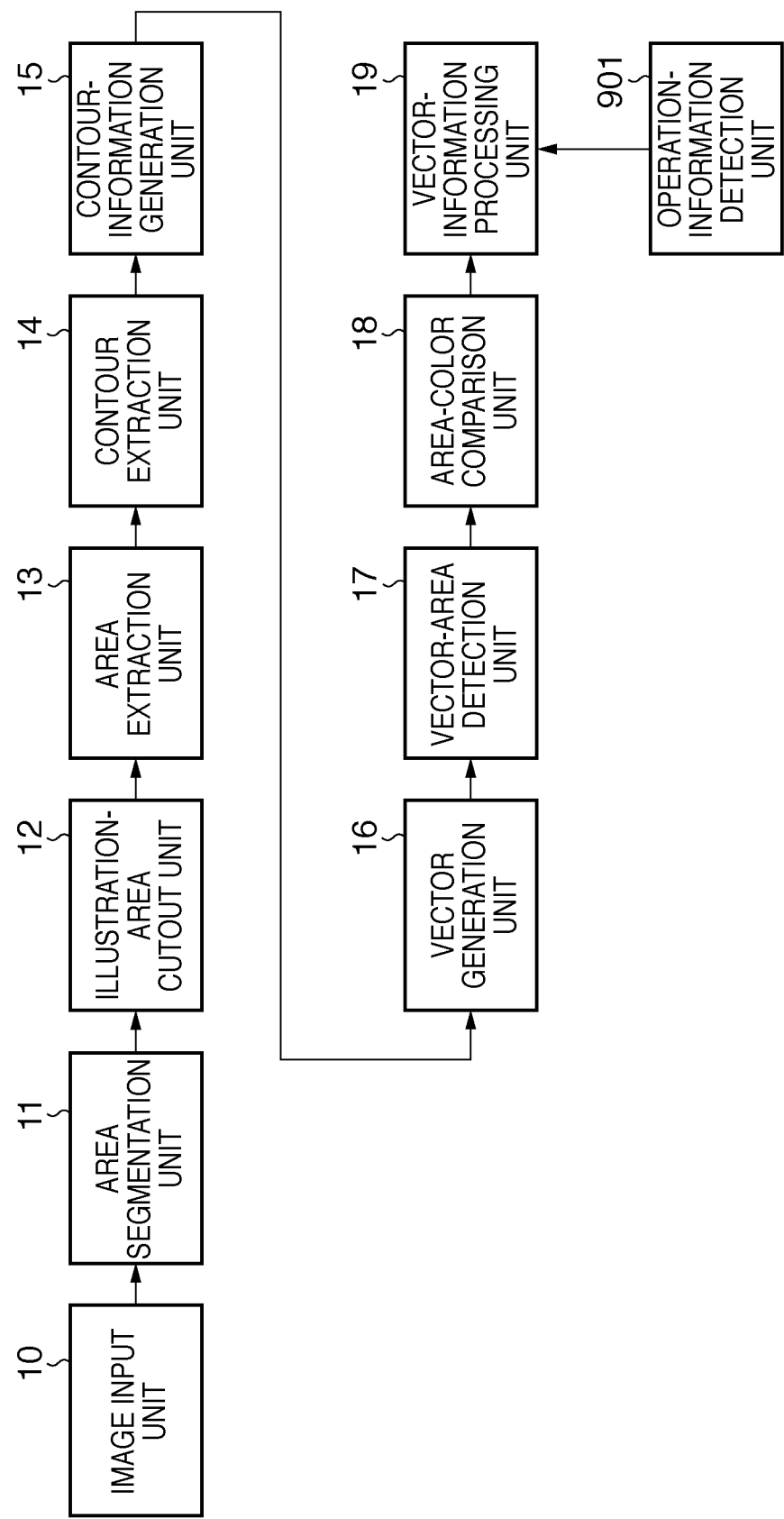
FIG. 9 is a block diagram of a configuration of an image processing apparatus according to a second exemplary embodiment.

Next, a second exemplary embodiment according to the present invention is described. Hereinafter, descriptions of the same or similar components to those described in the first exemplary embodiment are omitted, and only the processing that characterizes the second exemplary embodiment is described. FIG. 9 is a block diagram illustrating a configuration of an image processing apparatus according to the second exemplary embodiment. The configuration from the image input unit 10 to the area-color comparison unit 18 in FIG. 9 is identical to that described in FIG. 1. FIG. 9 thus differs from FIG. 1 only in that an operation-information detection unit 901 is further provided.

The operation-information detection unit 901 in FIG. 9 detects operations performed through a display unit (not shown) of the image processing apparatus. The term "operation" as used herein refers to, for example, user instructions such as printing, sending, and editing. A sending operation is performed, for example, at the time of sending data to any other image processing apparatus or at the time of sending data to a client PC. An editing operation is performed at the time of creating a layout for a single image page or at the time of modifying a layout into another such as a two-in-one layout, or the like. The editing operation is also performed at the time of moving a single area obtained by area segmentation to any other document or at the time of moving such a single area to another part of the same page. Such user operations are implemented, for example, through a generally-known user interface such as a screen, or the like.

In the present exemplary embodiment, the vector-information processing unit 19 is capable of selecting a method of processing vector information according to operation information detected by the operation-information detection unit 901. Here, the processing of vector information includes, for example, as described previously, deleting contour vector information or making a modification to contour vector information. Deletion of contour vector information can be implemented by deleting the vector information on only the appropriate contour. Modifications to contour vector information can be made by modifying the description of the vector data on the appropriate contour, for example, modifying the description to say that no color is applied. In the case of SVG, the description can be modified to "<path fill="none" . . . ", which provides the instruction to apply no color to a target contour loop.

Figure 10:
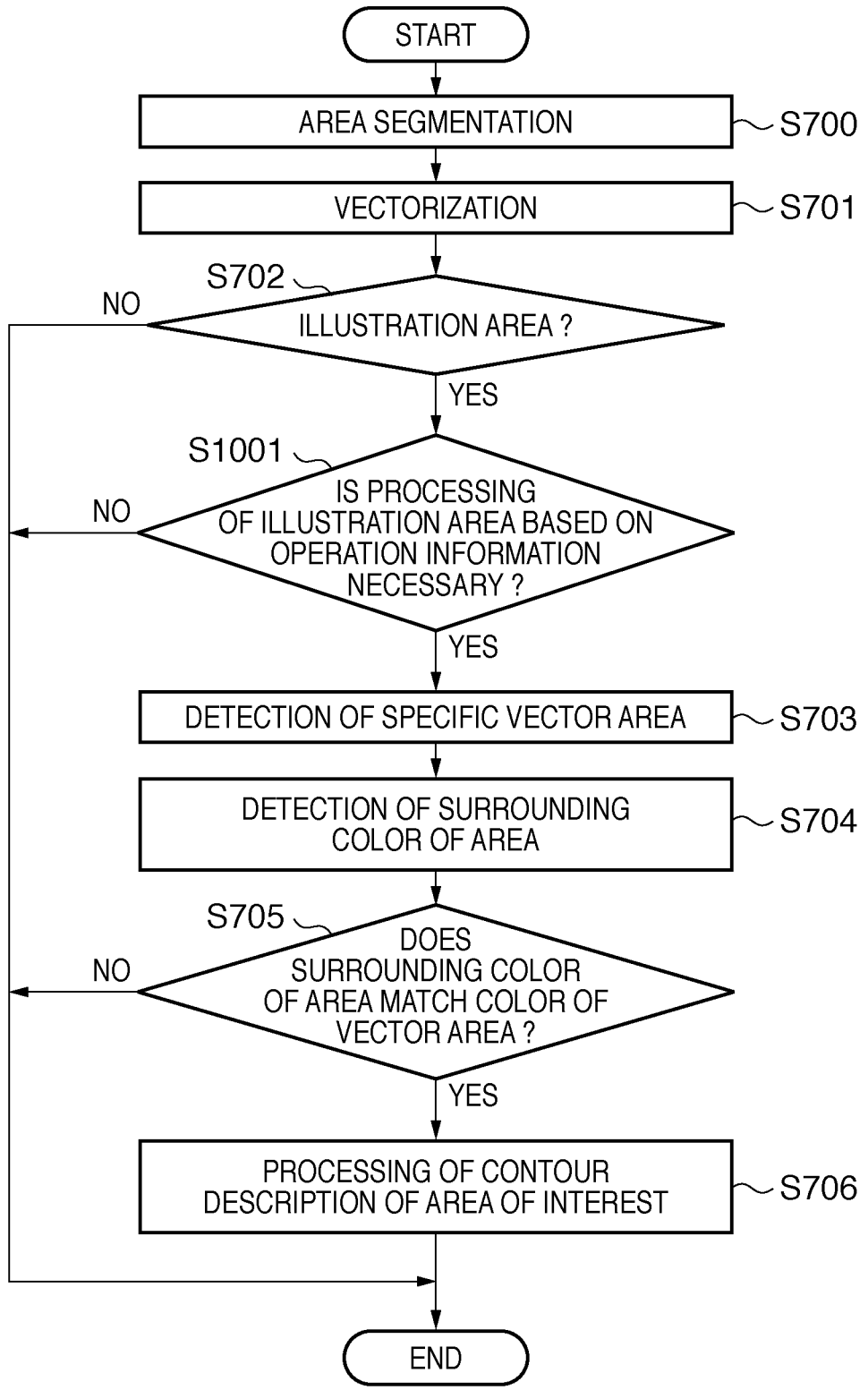
FIG. 10 is a flow chart illustrating the procedure of image processing according to the second exemplary embodiment.

FIG. 10 is a flow chart illustrating the procedure of image processing according to the second exemplary embodiment. The processing from steps S700 to S706 in FIG. 10 is identical to that described in FIG. 7. When, in step S702, the area is determined as being an illustration area, the process goes to step S1001.

In step S1001, illustration-area-operation detection processing is performed. In the illustration-area-operation detection processing, whether or not the processing of the illustration area is necessary is determined according to the operation information obtained by the operation-information detection unit 901 in FIG. 9. When the processing of the illustration area is determined as being necessary, the process goes to step S703; on the other hand, when the processing of the illustration area is determined as being unnecessary, the process is ended.

Figure 11:
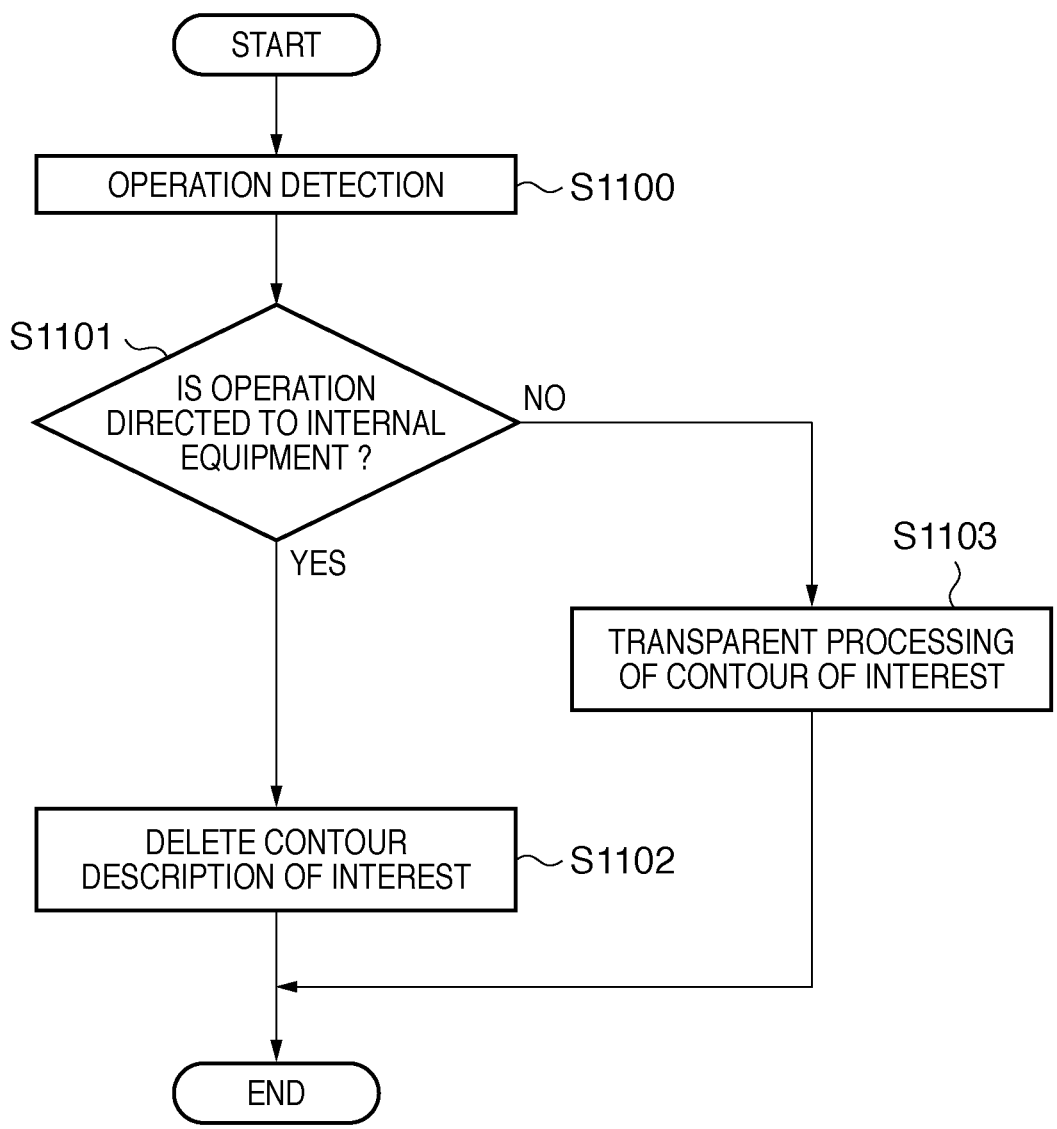
FIG. 11 is a flow chart illustrating the procedure of operation detection and the resultant processing of vector information according to an exemplary embodiment of the present invention.

Hereinafter, the operation information detected by the operation-information detection unit 901 and the resultant processing of vector information are described with reference to FIG. 11. FIG. 11 shows an example of the settings of the operation information and the processing of vector information. In the present exemplary embodiment, deleting the description of contour information of interest is previously set as an operation to be performed on the illustration area when data is moved or edited within an image processing apparatus or when data is sent to another apparatus of the same model (i.e., image processing apparatuses of the same type) that is connected by a network. Also, giving the description of contour information of interest to provide transparent coloring, for example, by modifying the description to say that no color is applied is previously set as an operation to be performed on the illustration area when data is transmitted to a client PC or any different type (model) of image processing apparatuses, or the like. Alternatively, a change to the settings so that transparent processing is not performed may be made possible.

First, in step S1100, the operation-information detection unit 901 detects operation information. Then, in step S1101, whether the operation is directed from the image processing apparatus to any other external device of a different model over a network or is performed within the image processing apparatus is determined. The term "external device" as used herein refers to a client PC or another totally different image processing apparatus. The wording "within the image processing apparatus" as used herein refers to those image processing apparatuses that are of the same type or model, connected by a network, and that are capable of transmitting various detailed and necessary information therebetween. When the operation is determined as being performed within the same model of image processing apparatuses, the process goes to step S1102; on the other hand, when the operation is determined as being directed to any external device of a different model over a network, the process goes to step S1103. In step S1102, the contour of interest is deleted and the process is ended. In step S1103, for example, transparent processing in which the description is modified to say that no color is applied is performed on the contour of interest to thereby obtain transparent coloring with the application of no color, and the process is ended. In the present exemplary embodiment, the processing of vector information may be performed in any other way according to detected operation information.

Third Exemplary Embodiment

Next, a third exemplary embodiment according to the present invention is described. Hereinafter, descriptions of the same or similar components to those described in the first and second exemplary embodiments are omitted, and only the processing that characterizes the third exemplary embodiment is described.

Figure 12:
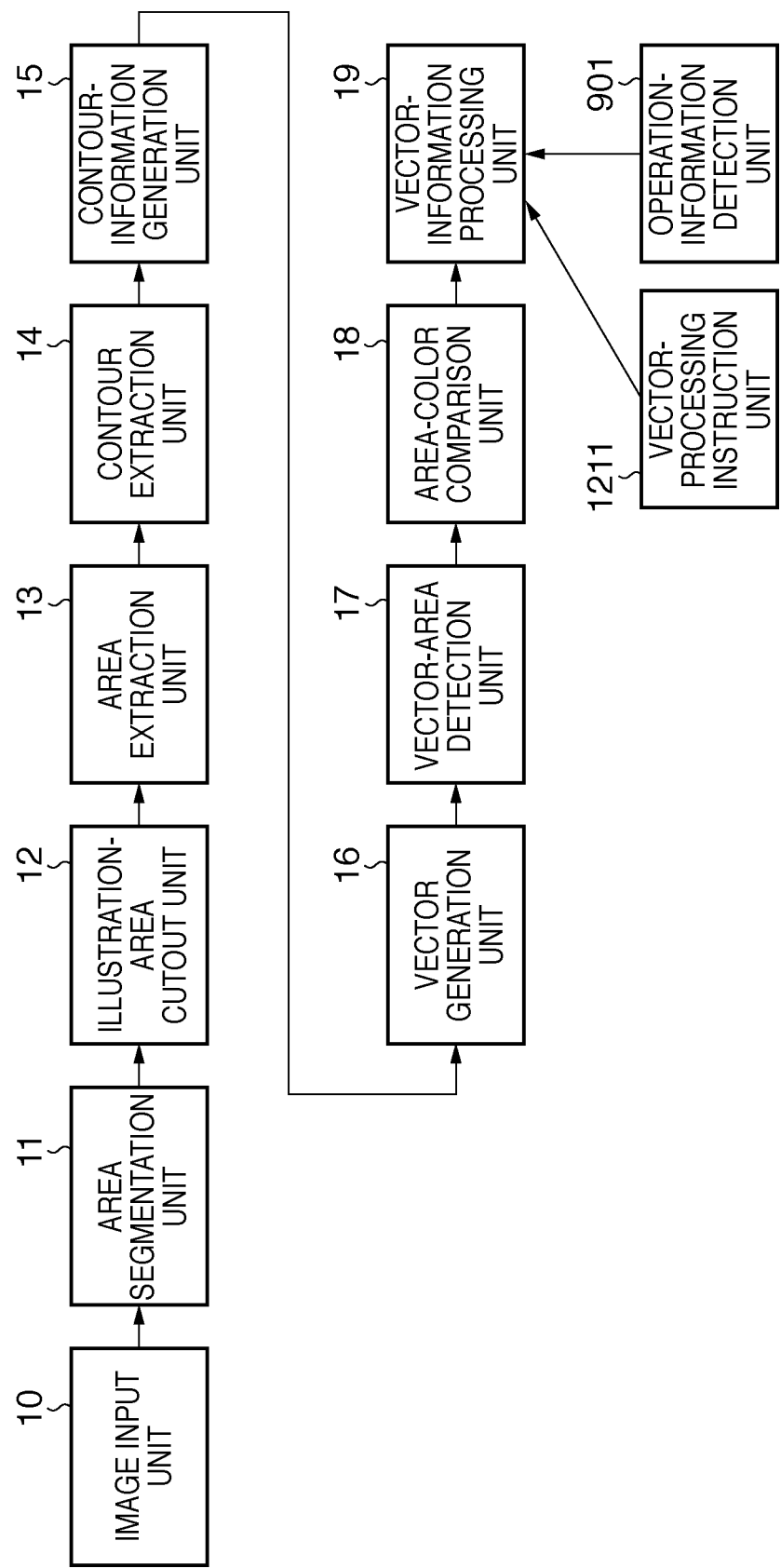
FIG. 12 is a block diagram of a configuration of an image processing apparatus according to a third exemplary embodiment.

FIG. 12 is a block diagram illustrating a configuration of an image processing apparatus according to the third exemplary embodiment. The configuration from the image input unit 10 to the vector-information processing unit 19 illustrated in FIG. 12 is identical to that described in FIG. 1. Also, the operation-information detection unit 901 in FIG. 12 is identical to that described in FIG. 9. FIG. 12 thus differs from FIG. 9 only in that a vector-processing instruction unit 1211 is further provided. The vector-processing instruction unit 1211 is capable of giving processing instructions according to user operations given through an operation unit (not shown) of an image processing apparatus. As a result, the processing of vector information can be performed according to the contents of given processing instructions. The processing of vector information includes the aforementioned deletion of contour information of interest, transparent processing of a contour of interest by, for example, modifying the description to say that no color is applied, and the like. Such processing instructions may be given upon every user operation.

Figure 13:
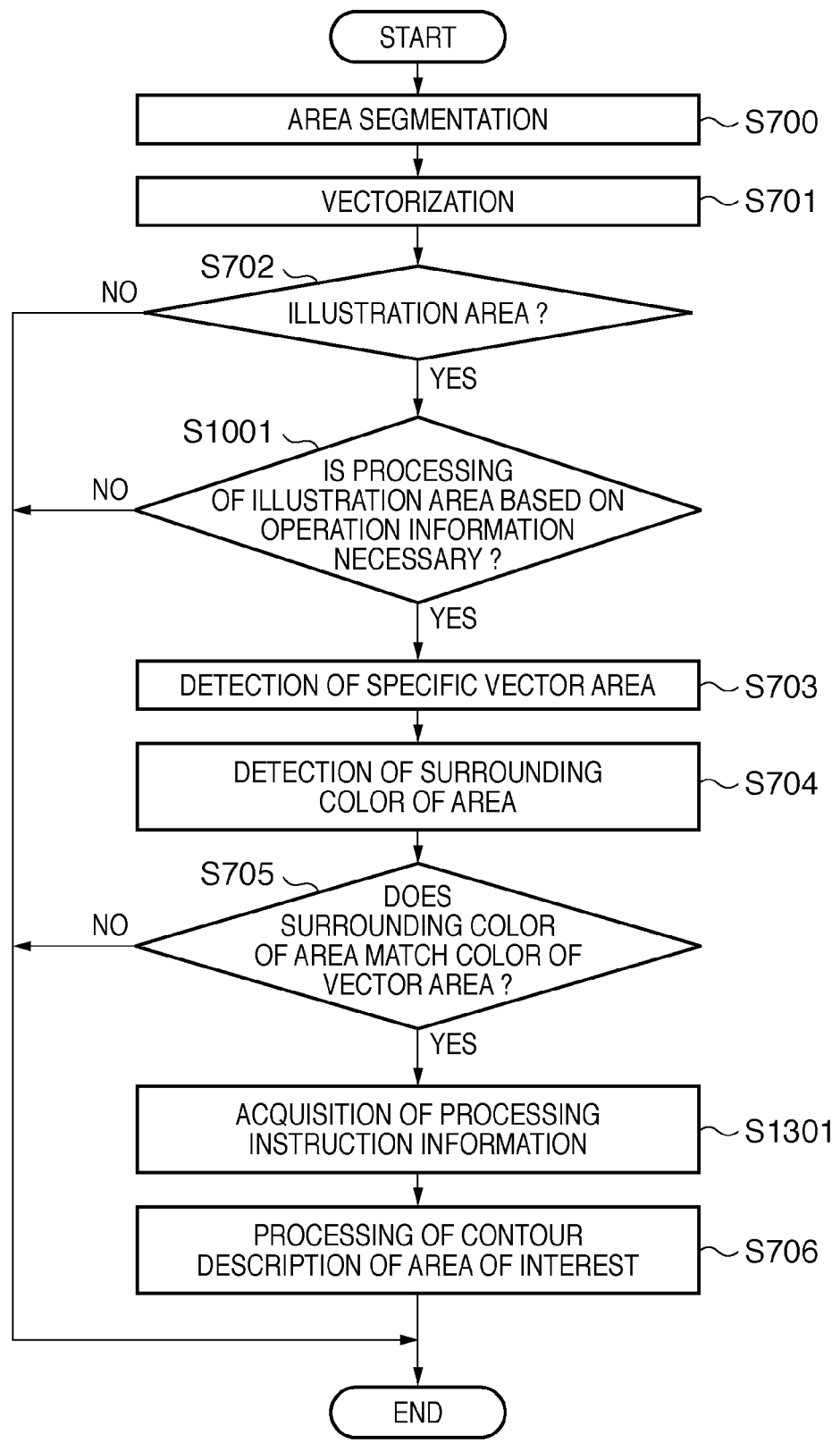
FIG. 13 is a flow chart illustrating the procedure of image processing according to the third exemplary embodiment.

FIG. 13 is a flow chart illustrating the procedure of image processing according to the third exemplary embodiment. In FIG. 13, the processing from steps S700 to S706 is identical to that described in FIG. 7. The processing in step S1001 in FIG. 13 is also identical to that described in FIG. 10. In step S705, when the color outside the illustration area and the color of a vector area are determined as being the same, the process goes to step S1301. Such determination is made by, for example, determining whether or not there is a match between the color outside the illustration area and the color of a vector area. Alternatively, such determination may be made by determining whether or not a difference between the color outside the illustration area and the color of a vector area falls within the prescribed limits. On the other hand, when those colors are determined as not being the same, the process is ended. In step S1301, processing-instruction-information acquisition processing is performed. In step S1301, processing instructions are acquired from an operation unit (not shown). At this time, the user can give instructions for the processing of vector information, such as deleting contour information with the operation unit or performing contour transparent processing such as modifying the description to say that no color is applied, or the like. In step S706, the processing of vector information is performed according to the contents of the instructions acquired in step S1301.

The present invention may be applied to either a system composed of a plurality of pieces of equipment or an apparatus composed of a single piece of equipment. According to the present invention, a software program that implements the aforementioned functions of the exemplary embodiments (a program that corresponds to any one of the flow charts illustrated in the drawings) is either directly or remotely supplied to such a system or an apparatus. The exemplary embodiments can also be implemented by the computer of such a system or an apparatus that reads out and executes a supplied program code. Thus, the present invention can also be implemented by a program code itself that is installed on a computer in order to implement the function processing of the present invention. In that case, as long as it has the function of a program, such a program code may come in any format such as an object code, a program implemented by an interpreter, or script data supplied by an OS, or the like.

Examples of a recording medium for supplying a program include a Floppy® disk, a hard disk, and an optical disk. Further examples include a magneto-optical disk, an MO, a CD-ROM, a CD-R, a CD-RW, a magnetic tape, a non-volatile memory card, a ROM, and a DVD (DVD-ROM or DVD-R), or the like.

In addition, such a program can be supplied by creating a connection to a website on the Internet, using a browser on a client's computer. A computer program itself of the present invention or its compressed file having an automatic installation function may be supplied by downloading from a connected website onto a recording medium such as a hard disk, or the like. Alternatively, such a program may also be supplied by dividing the program code of the program of the present invention into a plurality of files and downloading each file from a different website. In other words, the present invention also includes a www server that allows a plurality of users to download a program file for implementing the function of the present invention with a computer.

As another alternative, an encrypted image processing program according to the present invention may be stored in a storage medium such as a CR-ROM, or the like and distributed to the users, and only those users who have met prescribed conditions may be allowed to download decryption key information from a website through the Internet. Then, using such key information, an encrypted program may be executed and installed on a computer in order to implement the function of the present invention. Moreover, the aforementioned functions of the exemplary embodiments can also be implemented by executing a program read by a computer. Furthermore, according to instructions of such a program, the OS or the like on a computer may perform part or all of the actual processing in order to implement the functions of the aforementioned exemplary embodiments.

Additionally, a program that is read out from a recording medium may be written in a memory that is mounted on a feature expansion board inserted in a computer or a feature expansion unit connected to a computer. Thereafter, according to the instructions of such a program, a CPU or the like mounted on such a feature expansion board or a feature expansion unit may perform part or all of the actual processing in order to implement the aforementioned functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120764, filed May 2, 2008, which is hereby incorporated by reference herein in its entirety.

What is claimed is:

1. An image processing apparatus for extracting an illustration area from an input original image to generate vector data of the illustration area, comprising:
an area extraction unit configured to extract an area for each color from the illustration area;
a vector-data generation unit configured to generate vector data that represents each of the areas extracted by the area extraction unit;
an area specification unit configured to specify an area that is in contact with a boundary of the illustration area from among the areas extracted by the area extraction unit;
a color extraction unit configured to extract a color of an area surrounding the illustration area;
a determination unit configured to determine whether or not the color of the area surrounding the illustration area that has been extracted by the color extraction unit is the same as a color of the area specified by the area specification unit; and
a processing unit configured to process vector data that represents the specified area if the determination unit determines that the colors are the same.

2. The image processing apparatus according to claim 1, wherein the color extraction unit extracts the color in the area surrounding the illustration area at a given number of pixels away from the illustration area.

3. The image processing apparatus according to claim 1, wherein the processing unit deletes, in the vector data generated by the vector-data generation unit, vector data that represents a contour of the specified area, the color of which is determined to be the same as the color of the area surrounding the illustration area by the determination unit.

4. The image processing apparatus according to claim 1, wherein the processing unit changes the color of a contour line represented by the vector data, in the vector data generated by the vector-data generation unit, that represents the specified area, the color of which is determined to be the same as the color of the area surrounding the illustration area by the determination unit into transparent color.

5. The image processing apparatus according to claim 1, further comprising:
a detection unit configured to detect a user operation, wherein the processing unit performs processing according to the user operation.

6. An image processing method for extracting an illustration area from an input original image to generate vector data of the illustration area, the method comprising the steps of:
extracting an area for each color from the illustration area;
generating vector data that represents each of the areas extracted in the area extraction step;
specifying an area that is in contact with a boundary of the illustration area from among the areas extracted in the area extraction step;
extracting a color of an area surrounding the illustration area;
determining whether or not the color of the area surrounding the illustration area that has been extracted in the color extraction step is the same as the color of the area specified in the area specification step; and
processing vector data that represents the specified area if the determining step determines that the colors are the same.

7. A non-transitory computer-readable storage medium storing an image processing program for causing a computer to execute a process for extracting an illustration area from an input original image to generate vector data of the illustration area, the program causing the computer to function so as to:
extract an area for each color from the illustration area;
generate vector data that represents each of the extracted areas;
specify an area that is in contact with a boundary of the illustration area from among the extracted areas;
extract a color of an area surrounding the illustration area;
determine whether or not the extracted color of the area surrounding the illustration area is the same as the color of the specified area; and
process vector data that represents the specified area if it is determined that the colors are the same.

8. The image processing apparatus according to claim 5, wherein, in the case where the detection unit detects the user operation which is operated in the image processing apparatus for the illustration area, the processing unit deletes, in the vector data generated by the vector-data generation unit, vector data that represents the specified area, color of which is determined to be the same as the color of the area surrounding the illustration area by the determination unit, and
in the case where the detection unit detects the user operation which is operated in an external apparatus of a different model for the illustration area, the processing unit changes the color of a contour line represented by the vector data, in the vector data generated by the vector-data generation unit, that represents the specified area, color of which is determined to be the same as the color of the area surrounding the illustration area by the determination unit into transparent color.

9. The image processing method according to claim 6, wherein the step of extracting a color extracts the color in the area surrounding the illustration area at a given number of pixels away from the illustration area.

10. The image processing method according to claim 6, wherein the processing step deletes, in the vector data generated in the generating step, vector data that represents a contour of the specified area, color of which is determined to be the same as the color of the area surrounding the illustration area in the determining step.

11. The image processing method according to claim 6, wherein the processing step changes the color of a contour line represented by the vector data, in the vector data generated in the generating step, that represents the specified area, a color of which is determined to be the same as the color of the area surrounding the illustration area in the determining step into transparent color.

12. The image processing method according to claim 6, further comprising:
a detecting step that detects a user operation, wherein the processing step performs processing according to the user operation.

13. The image processing method according to claim 12, wherein, in the case where the detecting step detects the user operation which is operated in an image processing apparatus for the illustration area, the processing step deletes, in the vector data generated in the generating step, vector data that represents the specified area, a color of which is determined to be the same as the color of the area surrounding the illustration area in the determining step, and in the case where the detecting step detects the user operation which is operated in an external apparatus of a different model for the illustration area, the processing step changes the color of a contour line represented by the vector data, in the vector data generated in the generating step, that represents the specified area, a color of which is determined to be the same as the color of the area surrounding the illustration area in the determining step into transparent color.

14. The medium according to claim 7, wherein the function to extract a color extracts the color in the area surrounding the illustration area at a given number of pixels away from the illustration area.

15. The medium according to claim 7, wherein the function to process vector data deletes, in the vector data generated by the function to generate vector data, vector data that represents a contour of the specified area, a color of which is determined to be the same as the color of the area surrounding the illustration area by the determination function.

16. The medium according to claim 7, wherein the function to process vector data changes the color of a contour line represented by the vector data, in the vector data generated by the function to generate vector data, that represents the specified area, a color of which is determined to be the same as the color of the area surrounding the illustration area by the determination function into transparent color.

17. The medium according to claim 7, wherein the program further causes the computer to function so as to:

detect a user operation, wherein the processing function performs processing according to the user operation.

18. The medium according to claim 17, wherein, in the case where the function to detect detects the user operation which is operated in an image processing apparatus for the illustration area, the function to process vector data deletes, in the vector data generated by the function to generate vector data, vector data that represents the specified area, a color of which is determined to be the same as the color of the area surrounding the illustration area by the determination function, and in the case where the function to detect detects the user operation which is operated in an external apparatus of a different model for the illustration area, the function to process vector data changes the color of a contour line represented by the vector data, in the vector data generated by the function to generate vector data, that represents the specified area, a color of which is determined to be the same as the color of the area surrounding the illustration area by the determination function into transparent color.

* * * * *